United States Patent Office 2,952,192

MARKER STRIPE

Leon Nagin, Pittsburgh, Pa., assignor to Reliance Steel Products Company, McKeesport, Pa., a corporation of Pennsylvania No Drawing. Filed Nov. 24, 1954, Ser. No. 471,127

3 Claims. (Cl. 94—1.5)

This invention pertains generally to traffic marker stripes and more specifically to a new and novel method of forming such stripes and applying them to highways and other traffic direction media such as posts, signs, etc. of wood, metal, concrete, stone, and brick.

Markers on highways and structures at the sides of highways are used for directing traffic and instruction of motorists both by day and night. Heretofore, the usual practice in applying traffic marker stripes to highways has been to paint the marker stripes upon the highway using colored paints such as white, yellow and black. Traffic moving over the highway and upon the marking soon wears away such paints. Oil, dirt and other substances falling to the highway are ground into the paint so that their visibility are almost totally impaired within a short time.

An object of the present invention is to provide a marking stripe of the character described, which resists wear from traffic, destruction from oil, dirt, etc., and is readily applied to the highway.

Another object of the invention is to provide a highway marker stripe of the character described with substances which improves visibility of the stripe at night, and is likewise protected against wear or rapid destruction by dirt, oil, etc.

These and other objects will be made apparent to those skilled in the art by the following description of the manner of forming and applying such marker stripes to highways and other structures for direction of motorists.

A new type of resin known as epoxy resin identified as glycidyl ethers of polyhydric phenols have been developed which have great adhesive powers for attachment to metal, steel, concrete, stone, brick, and between the resins themselves. These resins readily wet the surface to which they are applied and may be cured in situ. When cured, or set, they are found to be wear-resistant, water-repellent, and may have filling material incorporated therein without loss of their adhesive, wear-resistant and water-repellent qualities. Some of these resins are transparent and are ideally suited to the purposes of this invention.

These resins may be obtained with suitable viscosities so as to be sprayed or spread as readily as paint, and when mixed with a suitable catalyst, may be cured in situ at suitable temperatures preferably above 32° F. The type and amount of catalyst used, as well as the nature and amount of filling material used will affect the curing time. The curing times thus vary from one-half to several hours. This rapid curing time makes them as convenient to use as the paints which they will replace. When combined with abrasives they also impart antiskid qualities to the portions of the highway to which they are applied.

According to the present invention a medium light epoxy resin is used, that is, one having a syrup-like consistency. Suitable materials for the purposes herein are "Epon" resins, grades 828, 834, 562 and "Araldite" resins grades AN 102, AN 115 and CN 502, these being typical of the commercially available resins but are not all of the satisfactory commercially available resins of this type which may be used. The resins, prior to use, are mixed with a catalyst which is usually a polyamine. Suitable catalysts are diethylene triamine, ethylene diamine, diethyl-amino-propylamine, dimethylamino-propylamine, piperidine and pyridine. The catalyst selected and the amount of catalyst used will affect the pot life of the resin, its curing time, and the temperature at which curing takes place. Diethylene-triamine has been found satisfactory for the purpose and the weight of the catalyst may be about 10% of the weight of the resin.

Epoxy resins are commercially available, the Epon and Araldite resins above referred to are sold by Shell Chemical Corporation and Ciba Co., Inc., respectively. The chemical structure of a typical molecule of epoxy resin sold under the above trade names of Epon and Araldite is as follows:

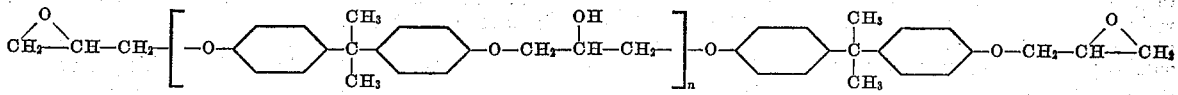

The resin is prepared for application by mixing with the selected catalyst. The selected additives may then be placed in the resin and mixed well, so as to be coated by the resin and catalyst. If desired, a sandwich type application may be made of two layers of resin and catalyst with the additive as an intermediate layer. The additives may be glass or polystyrene beads, sand-coated with fluorescent materials or other suitable light reflective materials. These additives do not have the wear and weather-resistant qualities of the resin, and it is preferable to add a relatively coarse grit to the mixture. Aluminum oxide in grain sizes between 6 and 12 mesh has been found suitable. The resin itself has a wear resistance equal to or exceeding normal concrete. If quick curing is desired or the ambient temperature is low, the resin mixture may be first heated and applied hot to the road surface.

Any suitable method may be employed to apply the resin to the desired surface. Painting and spraying are the usual methods of application. The fluorescent, phosphorescent, or light-reflective additives may be of any desired size or quantity. The resin has good wetting qualities during application and when cured is relatively non-wetting and exhibits a high resistance to wear. By keeping the additives, except the grit or abrasive materials, to a minimum for the intended purpose, the marker stripes formed of the resin tend to have long life. The additive being less wear-resistant than the resin will deteriorate more rapidly under wear or weathering conditions than the resin. In the case of additives such as beads and sand, the addition of the abrasive to the surface of the resin or mixed therein tends to protect the exposed beads and sand against wearing too rapidly. When fluorescent materials or tape are applied directly to the resin after application to the desired surface, these materials are sandwiched between coatings of the transparent resin. Here the undercoating of resin adheres to the highway or other surface to waterproof the sandwich material, and a top coating is adhered to the sandwich material and to the undercoating.

Example No. 1

The section of concrete highway to which a marker stripe is to be applied is first cleaned of dirt, oil and grease, using water and a detergent where necessary. The surface so cleaned is dried so that no dampness or moisture is apparent to the touch. A stripe of the resin mixed with a catalyst is then applied to the highway to a thickness of about 4 mils. Upon this stripe is placed a coating of phosphorescent material of a thickness to substantially cover the resin. A second coating of resin and catalyst is then placed over the phosphorescent material so as to fully enclose the material. This second resin coating is of a thickness sufficient to fill any voids in the phosphorescent material and provide a continuous film over the material. The stripe is then protected for a period necessary for the resin to cure.

*Example No. 2*

The highway surface is prepared in the same manner as Example No. 1 and a coating of resin and catalyst applied to the cleaned surface to form a stripe. The resin strip is allowed to cure and a stripe of fluorescent paint or a strip of fluoroescent tape applied to the resin. The paint or tape may then be sprayed with a coating of the resin and catalyst, then permitted to air cure.

*Example No. 3*

A section of highway to be striped is cleaned and dried as in Example No. 1. The resin is mixed with the catalyst and before applying to the highway, a quantity of glass or polymerized styrene beads are mixed with the resin. This mixture may then be sprayed or spread upon the prepared highway surface to form the desired stripe. The resin coating applied to the beads not only protects them against wear, but also insures their adherence to the stripe. As an additional protective for the beads, a suitable grit such as aluminum oxide may also be mixed with the resin and beads before applying the stripe to the highway.

*Example No. 4*

A section of highway to be striped is cleaned and dried as before. The resin is mixed with a catalyst and then a quantity of fluorescent sand and an abrasive is mixed with the resin before being applied as a stripe to the highway.

The resin is expensive and its cost per unit of stripe may be reduced by applying a thin coating thereof to the highway or other structure. The use of the grit or abrasive material builds a protective body between the less wear-resistant light-reflective additives. Due to the good wetting qualities of the resin both the additives and the grit have a coating of the resin thereon which adds to their wear-resistance qualities and securely anchors them in place. Due to the hardness and water-repellent qualities of the cured resin, a highway stripe made therefrom is not only long-lasting, but is readily cleaned by rain or other water which may flush the highway. Ice does not readily adhere to the resin so that the stripes are readily cleared of ice by traffic. The quantities and character of the additives may be varied so long as they serve the intended purpose of a marker stripe.

Having thus described my invention and the best modes of using it, I claim:

1. The method of forming a traffic marker stripe upon a highway comprising cleaning the highway of dirt and grease in the area where the stripe is to be applied, spreading upon the cleaned highway area a stripe of a mixture of a transparent epoxy resin of the class comprising a glycidyl ether of a polyhydric phenol, a catalyst and sand having a coating of fluorescent material thereon, and allowing the mixture to cure in situ.

2. The method of forming a traffic marker stripe upon a highway comprising cleaning the highway of dirt, oil and grease in the area where the stripe is to be applied, spreading upon the cleaned area of the highway a stripe of a mixture of a transparent epoxy resin of the class comprising a glycidyl ether of a polyhydric phenol, a polyamine catalyst in an amount of about 10 percent of the weight of the resin and a light reflective additive, and allowing the mixture to cure in situ.

3. The method as in claim 2 wherein the additive is light reflective beads.

References Cited in the file of this patent

UNITED STATES PATENTS

| | | |
|---|---|---|
| 1,986,591 | Meyer | Jan. 1, 1935 |
| 2,169,657 | Millson | Aug. 15, 1939 |
| 2,246,898 | Sayre | June 24, 1941 |
| 2,330,843 | Rodli et al. | Oct. 5, 1943 |
| 2,366,754 | Rodli | Jan. 9, 1945 |
| 2,367,040 | Miskelly | Jan. 9, 1945 |
| 2,379,741 | Palmquist | July 3, 1945 |
| 2,407,680 | Palmquist et al. | Sept. 17, 1946 |
| 2,468,056 | Goepfert | Apr. 26, 1949 |
| 2,574,972 | Hill | Nov. 13, 1951 |
| 2,602,785 | Wiles et al. | July 8, 1952 |
| 2,682,515 | Naps | June 29, 1954 |
| 2,705,223 | Renfrew et al. | Mar. 29, 1955 |
| 2,735,829 | Wiles et al. | Feb. 21, 1956 |

FOREIGN PATENTS

| | | |
|---|---|---|
| 705,457 | Great Britain | Mar. 10, 1954 |

OTHER REFERENCES

Paint, Oil and Chemical Review, p. 15, Nov. 9, 1950.